United States Patent [19]

Lessen

[11] Patent Number: 5,461,898
[45] Date of Patent: Oct. 31, 1995

[54] METHOD AND APPARATUS FOR EXTRUSION OF TUBING SHEETING AND PROFILE SHAPES

[76] Inventor: Martin Lessen, 12 Country Club Dr., Rochester, N.Y. 14618

[21] Appl. No.: 164,385

[22] Filed: Dec. 9, 1993

Related U.S. Application Data

[63] Continuation-in-part of Ser. No. 23,365, Feb. 26, 1993, abandoned.

[51] Int. Cl.⁶ .................................................. B21C 25/02
[52] U.S. Cl. ...................... 72/256; 72/264; 264/209.8; 425/380
[58] Field of Search ........................... 72/256, 262, 264, 72/269, 467; 264/108, 209.2, 209.8; 425/380, 381

[56] References Cited

U.S. PATENT DOCUMENTS

| | | | |
|---|---|---|---|
| 3,008,187 | 11/1961 | Slade | 72/467 |
| 3,256,560 | 6/1966 | Adomaitis | 264/108 |
| 3,267,712 | 8/1966 | Atkin | 72/264 |
| 3,404,203 | 10/1968 | Donald | 264/209.2 |
| 3,575,030 | 4/1971 | Braeuninger | 72/269 |
| 3,890,416 | 6/1975 | Bauer et al. | 264/209.8 |
| 4,076,481 | 2/1978 | Sansone | 425/380 |
| 4,300,378 | 11/1981 | Thiruvarudchelvan | 72/256 |
| 4,876,051 | 10/1989 | Campbell et al. | 264/209.8 |

*Primary Examiner*—Lowell A. Larson
*Attorney, Agent, or Firm*—William F. Noval

[57] ABSTRACT

Method and apparatus for the extrusion of tubing, sheets and profile shapes, wherein shearing strains in the material being extruded through a die serve to orient the microstructures of the material so that its strength properties are improved in the direction transverse to the extruding direction.

23 Claims, 2 Drawing Sheets

METHOD AND APPARATUS FOR EXTRUSION OF TUBING SHEETING AND PROFILE SHAPES

CROSS REFERENCE TO RELATED APPLICATIONS

This application is a continuation-part application of copending U.S. patent application Ser. No. 023,365, filed 02/26/93 inventor Lessen (now abandoned).

FIELD OF THE INVENTION

This invention relates in general to the extrusion of material and, more particularly to new and improved method and apparatus for the extrusion of tubing, sheets, and profile shapes.

BACKGROUND OF THE INVENTION

The property of isotropy in a material implies that all physical properties, including elastic, plastic, and strength properties, are invariant with respect to the direction of observation. Anisotropy, on the other hand, implies that the various physical properties of the material are a function of the direction of observation. For example, wood is an anisotropic material in that its properties in the direction of the grain are different from those in a direction perpendicular to the grain.

When a material which is initially isotropic is extruded, it will become anisotropic unless the microstructure of the material is allowed sufficient time to relax toward isotropy before the material is quenched.

During the extrusion process, the material is generally extended in the direction of extrusion and contracted in the directions perpendicular to the direction of extrusion. In the case of extrusion of sheets, the material is extended in the directions of extrusion and of the width of the sheet, but contracted in the direction of the thickness of the sheet. If the material is a long chain polymeric substance, the extrusion process will tend to align the molecules in the direction of the extrusion. Since the long chain polymeric chemical bonds are generally stronger than cross-linking bonds between chains, the strength of the aligned polymer is greater in the direction of alignment than perpendicular to it. In the case of a polycrystalline solid, the slip systems within the crystal grains will cause the deformed grains to align themselves in the direction of extrusion with material strength implications similar to that for a long chain polymeric material, i.e., greater tensile strengths in the direction of extrusion than transverse to the direction of extrusion.

For extrusions such as pipe, conduit, drain gutters, and other cross-sectional shapes, the tensile strength transverse to the direction of extrusion may be more important than that in the direction of extrusion. For example, in a tube or pipe under internal pressure, the wall stress in an axial direction is half that of the wall stress in a tangential direction. Yet, with conventional pipe extrusion, the strength of the material in the axial direction is greater than that in the tangential direction. Thus, in conventional extrusion, the material for piping or tubing is disadvantageously oriented. In like manner, for a conventionally extruded profile shape or sheet, the bending strength in the direction transverse to the direction of extrusion is less than that in the direction of extrusion, because the transverse elongation during extrusion is less than the elongation in the direction of extrusion.

There exists a method of orienting the extruded material somewhat in the tangential direction while it is already oriented in the axial direction (termed bi-axial orientation) by enlarging the diameter (and hence the circumference) of the tubing or pipe at the end of the extrusion process. (See,e.g., *P.V.C. Technology*, Fourth Ed., W. V. Titov, Elsevier Applied Science Publishers, 1984, Essex England, P. 882; The Encyclopedia of Plastics Equipment, pages 425–427, ed, H. R. Simonds, Reinhold Publishing Corp., New York, 1964). However, for a significant tangential elongation, the resulting tubing is limited in thickness. Similarly, the material of a sheet extrusion can be bi-axially oriented by stretching it in the transverse direction after it is extruded.

An interesting type of material orientation on a larger scale than heretofore discussed is described in Winton L. Slade, "Method and Apparatus for Extruding Polytetraflouroethylene Tubing" U.S. Pat. No. 3,008,187, Nov. 14, 1961. It was noted that in the manufacture of said tubing from a powder of the tubing material which was initially suspended in an organic extrusion aid to form a paste and then formed into an annular billet, when the billet was extruded through a tube forming die, the powder of the tubing material formed fibres which were oriented in the direction of extrusion. After extrusion the tubing was sintered and the fibrous structure and associated voids disappeared. However, the resulting tubing seemed to seep low viscosity fluids and thus Slade provided a remedy which consisted of having large helical grooves on the male and female portions of his extrusion die. Since the direction of extrusion inside the grooves was helical, the opposing helices of the male and female extrusion die members resulted in opposing helical fibre structures of the material on the inner and outer surfaces of the tubing which after sintering and resulting shrinkage, had an inhibiting effect on fissuring and resulting seepage. It is to be noted that in the Slade process, the initially powdered state has no orientation, inasmuch as the granules are of amorphous and isotropic material and may be considered as being approximately spherical in shape. The orientation of the extruded state is formed by the extrusion process and lies in the local direction of extrusion; virtually all of the granules in the grooves become aligned fibres in the direction of the grooves. For greatest effect, it is important for the maximum amount of granules to pass through the grooves and the minimum amount of granules to pass through the annulus between both sets of grooves. The recommended angle between both sets of grooves and hence fibres is from 15° to 60°, and the recommended depth of each of both sets of grooves is from two to five times the thickness of the annulus between the grooves according to Slade. It is also to be noted that in extruding a long chain polymer or a polycrystalline solid, the initial orientation of the molecular chains or crystal grains is random and that after extrusion, there is a statistical directional orientation distribution that favors the direction of extrusion, but that also leaves some chains or grains still disadvantageously oriented. For a polycrystalline solid, the strengthening effect in the direction of elongation is known as strain-hardening.

Slade also discloses the possibility of rotating the male portion of the die relative to the female portion of the die during extrusion.

Another interesting process involving large strains superposed on extrusion or drawing of rods and pipes is describes in Sinnathamby Thiruvarudchelvan "Method and Apparatus for Forming Elongated Articles Having Reduced Diameter Cross Sections" U.S. Pat. No. 4,300,378, Nov. 17, 1981. This process consists of "a method and apparatus for forming elongated articles whereby a torque is transmitted to the deforming material as it passes through a die cavity to facilitate the reduction in cross-section as it passes therethrough." The torque twists the rod being extruded about the axis of symmetry by rotating at least one part of the die during operation. In the case of pipe extrusion, the rod is concomitantly pierced by a smooth mandrel. The stress in this case is a shearing stress on a plane perpendicular to the axis of symmetry and in a direction perpendicular to the radius from the axis. The deformation produced is similar to that in a pack of playing cards held between the palms of both hands with one palm then rotated in its plane relative to the other. This is not the effect operating in the present invention.

SUMMARY OF INVENTION

According to the present invention, there is provided new and improved method and apparatus for extruding material such as tubing, sheets, and profile shapes. It has been found that a large shearing deformation will orient a material in much the same way as an elongation. A shearing deformation can be defined by considering two parallel planes in a medium where the planes are attached to the medium. If the medium is so deformed that one plane is displaced in a parallel direction relative to the other plane, the shearing deformation is given by the displacement gradient, or the ratio of the displacement to the perpendicular distance between the two planes. The usual deformation considered in Elasticity Theory is small compared to 1. In this present invention the deformation is of the order of 10. and may be classed as large. It is a feature of the apparatus of one embodiment of the present invention that a very large shearing deformation can be effected with a suitable static extruding die having a set of shearing grooves which extend generally in the direction of, but at an angle to, the direction of extrusion.

According to an aspect of the present inventon, an extrusion die is provided for extruding tubing having an inner die (pin) with a set of shearing grooves which extend generally in the direction of, but at an angle to, the direction of extrusion, and further having an outer die (bushing) spaced from said inner die and having a set of shearing grooves which extend generally in the direction of, but at an angle to, the direction of extrusion. The grooves of the outer die must extend at a different angle than the grooves of said inner die. It is most advantageous for the grooves of the outer die to lie at an opposite angle to the direction of extrusion than the grooves of the inner die. However, for ease of manufacture, one or the other set of grooves (but not both sets) may lie in the direction of extrusion (i.e., the axial direction).

It should be noted that since the large shearing deformation takes place in the annulus between the outer die and the inner die, and the material flowing in the grooves of said inner and outer dies is not sheared, it is important for the total cross-sectional areas of both sets of grooves to be minimized consistent with providing a maximum shear deformation to the material in the annulus. In this regard, the function of the grooves in this application differs from the function of the grooves in Slade as previously discussed.

According to still another aspect of the present invention, new and improved method is provided for extruding material of a predetermined cross section comprising the steps of: providing material to be extruded; applying, extruded forces to said extrudable material to produce extruded material having a predetermined cross section; and concurrently applying a shearing deformation to said material in a direction transverse to the direction of extrusion, to produce extruded material with increased strength transverse to the direction of extrusion and in the direction of shearing.

Another embodiment of the present invention as applied to tubing extrusion lies in applying a large shearing deformation to the material during extrusion by rotating the pin about its axis of symmetry relative to the bushing where the pin and bushing are suitably grooved. Furthermore, if the pin is either an integral part of the extruder screw for a single screw extruder or one of the screws of a multiple screw extruder, and the bushing is secured directly to the extruder barrel or to a suitable adapter, the need for an extrusion head and spider to hold the pin is eliminated. The hollow screw that is usually water or liquid cooled can then permit water to be supplied directly to a hollow pin, which water can drain into the tubing being extruded to cool the tubing from the inside while a water bath cools the tubing from the outside and prevents relaxation of the bi-axial orientation of the material obtained in the die. Additionally, if the grooves of the pin are of opposite hand to the grooves in the bushing, the rotation of the pin relative to the bushing can not only serve to shear the material being extruded, but also to propel the material in an axial direction. If, on the other hand, it is desired to subject the material to a large hydrostatic pressure during extrusion the grooves can be designed to exert thrust on the material in a retrograde axial direction.

DESCRIPTION OF THE PREFERRED EMBODIMENTS

In general, the apparatus of the present invention comprises cooperating extrusion dies for extruding tubing, sheets and other cross-sectional shapes of polymeric material, such as polyvinyl chloride, and of metallic material, such as titanium. By using dies according to the present invention, the microstructure of the extruded material is arranged so that the strength of the materials transverse to the direction of extrusion is greater than that obtainable with ordinary dies.

During the extrusion process the materials undergo a large shearing deformation in a direction transverse to the direction of extrusion. The shearing deformation takes place as the cross-sectional thickness of the extruded material is being reduced, thus keeping the material in contact with the extruding surfaces of the dies and maintaining a sufficient hydrostatic pressure. The extruding surfaces contain grooves or ridges which lie at an angle to the direction of the extrusion (but at different or opposite angles on the opposing surfaces of the die) so that in passing between the die faces, the material is sheared. In addition, the lines in the material caused by a spider or other structure supporting the male portion of a tubing die (pin) within the female portion of the die (bushing) are spread over a large area by the shearing motion. Since the material tends to be weakest along the spider lines, an increase in the area of the spider line under stress also improves the strength of the tube extruded according to the present invention.

Figure 1:
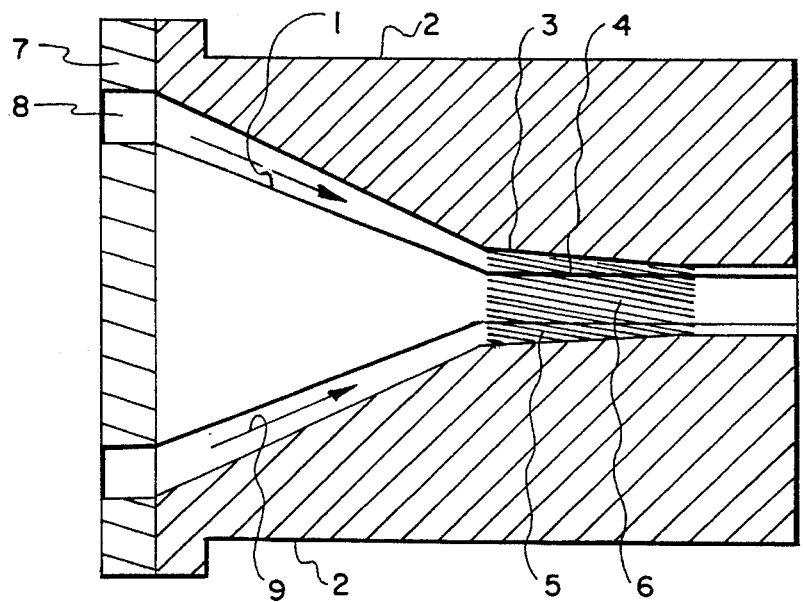
FIG. 1 is a partially cross-sectional, elevational view of an embodiment of the apparatus of the present invention for extruding tubing.

Referring now to FIG. 1, there is shown an embodiment of the present invention for extruding tubing or pipes. As shown, a tube or pipe extrusion die includes an inner die or pin 1 (not shown in cross section) and an outer die or bushing 2 (shown in cross section) which comprise the male and female components of the die, respectively. The pin 1 and bushing 2 have facing groove sections 4 and 3 which extend at least part of the length thereof. Grooved sections 4 and 3 have respective sets of helical grooves 6 and 5 of opposite sense on the extrusion forming surfaces. Grooves 6 and 5 extend in the direction of, but at an angle to the direction of extrusion. Grooves 6 and 5 serve to shear material as it progresses through the die. The helical grooves 6 and 5 make a smooth transition at both ends of the grooved sections 4 and 3 and vary in depth from the inlet (left) to the outlet (right) of the die, until the grooves disappear. Thus, smooth tubing or pipe is extruded from the die.

Pin 1 is supported by a spider 7 having spider holes 8. Extruded material, such as polymeric material or metallic material, flows in the direction of arrow 9. Metallic material would most likely be extruded from an annular billet without passing through a spider.

The pin 1 may contain a passage (not shown) for a fluid, such as water, to quench the extruded pipe as it emerges from the die. The extruded pipe may also be quenched externally after sizing, as per known processes. The temperature of the die where shearing takes place may be controlled by coolant in hollow chambers of the bushing and a hollow pin with coolant supplied through the spider or before a crosshead. Additionally, the inside of the pin may be so insulated that unwanted cooling does not occur.

In the embodiment of FIG. 1, the sets of grooves 6 and 5 may be of opposite sense or one set of grooves may extend axially in the direction of the extrusion.

Figure 2A:
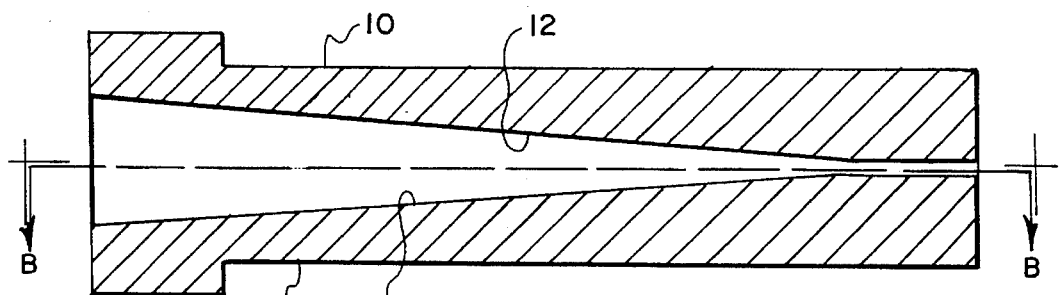
FIG. 2 is a cross-sectional, elevational view of another embodiment of the, apparatus of the present invention for extruding sheet material.
Figure 2B:
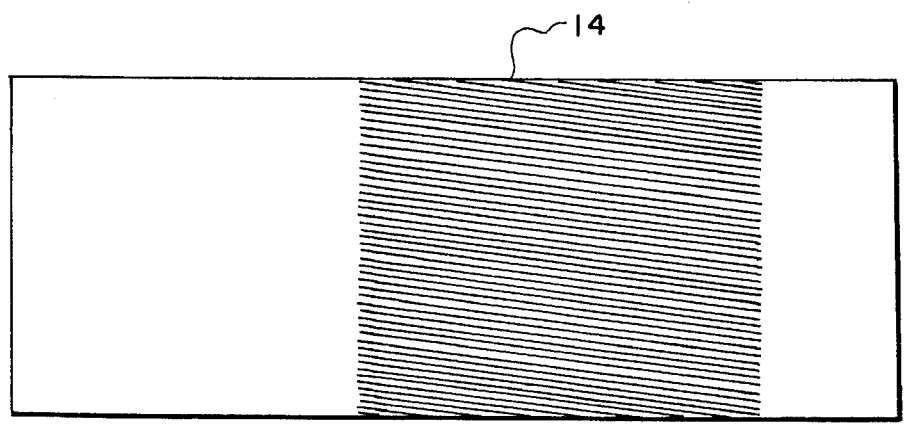

FIGS. 2(a) and 2(b) show another embodiment of the present invention for extruding sheet material. As shown in FIG. 2(a), a die set includes upper die half 10 and lower die half 11 having respective grooved sections 12 and 13. As shown in FIG. 2(b), grooved sections 12 and 13 have grooves 14 which extend in the direction of, but at an angle to the direction of extrusion. When assembled, the grooves are at opposite angles such that the extruded material is sheared during the extrusion process. Die halves 10 and 11 are so proportioned that the cross sectional area of the extrusion passage decreases as the material is sheared.

Figure 3:
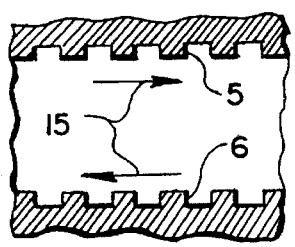
FIGS. 3–7 are cross-sectional, elevational views of groove profiles of dies useful in the present invention.
Figure 6:
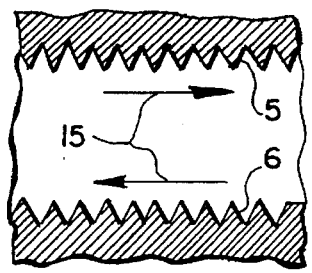
Figure 4:
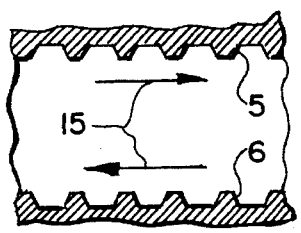
Figure 7:
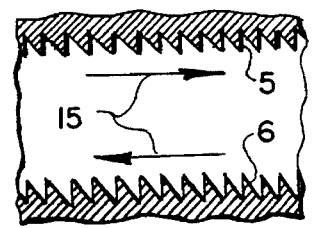
Figure 5:
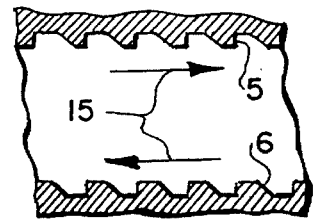

FIGS. 3–7 show respective preferred cross-sectional shapes for the grooves 5,6 of the embodiment of FIG. 1 or of the grooves 14 of the embodiment of FIG. 2. In each of FIGS. 3–7, shearing is effected in the directions of arrows 15. In FIG. 3, the grooves 5,6 have a rectangular cross section. In FIG. 4, the grooves 5,6 have a frustrum of an isosceles triangle cross section. In FIG. 5, the grooves 5,6 have a frustrum of a right triangle cross-section. In FIG. 6, the grooves 5,6 have an isosceles triangle cross-section. In FIG. 7, the grooves 5,6 have a right triangle cross-section.

It will be understood by those skilled in the art that grooves 5,6 may have cross-sections other than those shown. It will also be understood that projections of similar cross-section to those of FIGS. 3–7 may be substituted for the grooves to effect shearing of extruded material.

It should be noted that the grooves or projections to accomplish large shearing deformation in the annulus must have relatively sharp edges to grip the extruded material in shear as contrasted to the "smooth curved surfaces" of the grooves as disclosed in Slade (as forementioned), which would be very poor in, shearing.

Figure 8:
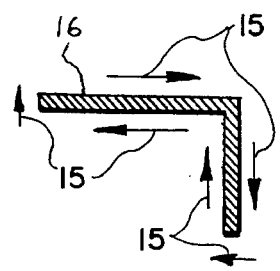
FIG. 8 is a diagrammatic view illustrating profile extrusion according to the present invention.

FIG. 8 shows an L-shaped profile extrusion 16. Any profile may be extruded. The extruding faces of the extruding passages have sets of inclined grooves in order to effect shear of the extruded material in a manner similar to that described above with respect to the embodiments of FIGS. 1 and 2. Arrows 15 show the direction of the shear.

Figure 9:
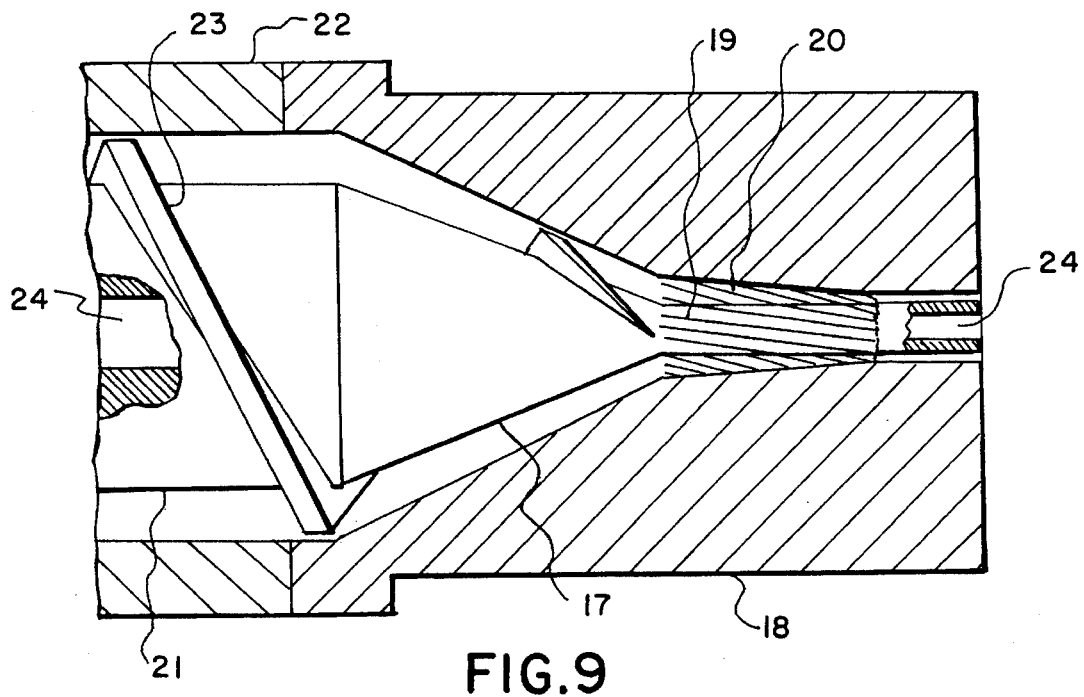
FIG. 9 is a partially cross-sectional, elevational view of an embodiment of the apparatus of the present invention for extruding tubing using a rotating pin-extruder screw combination and a bushing directly secured to the extruder barrel or an adapter.

FIG. 9 shows a pipe extrusion die as in FIG. 1 but having the pin either integral with, or mounted on the extruder feed screw. The extrusion die consists of a pin 17 (shown in partial section), bushing 18 shown in section having respective sets of shearing grooves 19,20. The pin is either integral with the extruder feed screw 21 or affixed to it. The grooves not only serve to shear the material as it is being extruded but are also designed to concurrently either propel the material axially, resist the axial motion of the material, or have no effect on the axial thrust exerted on the material as the pin 17 is rotated about its axis of symmetry. The feed screw rotates inside the barrel 22 of the extruder. The extruder may be either of the single screw design (as shown) or the multiple screw design (not shown) with an appropriate adapter. The screw has threads or flights 23 and with the pin 17 is hollow 24 to permit the flow of coolant interiorly; the interior coolant passage may be partially thermally insulated (not shown). The hollow screw also permits coolant to flow out through the hollow pin to cool the pin and the interior of the extruded pipe. The flights 23 may extend on to the pin up to the shearing grooves.

EXAMPLES

Polyvinyl chloride (PVC) material with no toughening additive was used to extrude a length of one inch diameter conduit using an extrusion die of the configuration shown in FIG. 1. The bushing 2 had a grooved section 3 with 30 axial grooves 5 having a rectangular cross-section. The pin 1 had a cylindrical grooved section 4 with 30 grooves 6 which spiraled 120 degrees about the pin axis. The radial clearance (annular width) between the pin and the bushing decreased by about 50% from one end of the grooved sections to the other.

The groove dimensions on both the pin and bushing were 0.0625 inches wide and 0.015 inches deep. The width of the annulus between the pin and the bushing at its narrowest point was 0.115 inches. The total cross-sectional area of both sets of grooves was 0.0562 square inches whereas the cross-sectional area of the annulus at its narrowest was 0.4489 square inches. The ratio of the groove to annulus areas in this case was 0.1252. The ratio of groove height to annulus width was 0.0767; the corresponding ratio for Slade (as forementioned) was from 2 to 5.

In a test of the one inch PVC conduit extruded by the method and apparatus of the present invention, the conduit withstood a transverse impact load of 50 ft.-lbs. (20 lbs. dropped from a height of 2.5 ft.). In comparison, conduit of identical dimension and composition, but conventionally extruded, withstood only 10 ft.-lbs. (20 lbs. dropped from 0.5 ft. height).

In order to satisfy specification, one inch diameter conduit typically must withstand an impact loading of 100 ft.-lbs. Therfore, with conventional extrusion, 5 parts of an expensive toughing additive (such as HYCAR) must be added per hundred parts of PVC in order to obtain the required strength. In another example according to the present invention, a length of conduit was extruded using the grooved die as above. The conduit was made of PVC having chlorinated polyethylene (a cheaper additive than HYCAR) added as a toughening agent (2 parts per hundred parts of PVC). The conduit withstood a shock loading of 180 ft.-lbs. (20 lbs. dropped from a height of 9 ft.) This conduit was the strongest tubing of its type ever tested at this facility.

It is clear that tubing having shearing extrusion according to the present invention, makes possible either super-strong extrusions, conventionally strong, extrusions using less material, conventionally strong extrusions using less expensive fillers or foam or smaller portions of more expensive additives, or combinations of the foregoing.

What is claimed is:

1. A method for extruding material of a predetermined, walled cross-section comprising the steps of:

providing material to be extruded;

applying extruding forces to said extrudable material to produce extruded material having a predetermined, walled cross-section having opposite surfaces; and applying a large shearing deformation to the greater part of said material being extruded with material displacement in a direction tangential to the surfaces of the material and generally perpendicular to the direction of extrusion, said displacement having a displacement gradient in a direction perpendicular to said surfaces while said extruding forces are being applied and the cross-section of the material is being reduced to produce extruded material with increased strength transverse to the direction of extrusion with a minimum of unsheared material, wherein said applying steps are effected by first and second dies spaced from one another; and two sets of shearing grooves with opposing lands on said first and second dies, respectively, wherein the total extrusion flow cross-sectional area of said grooves is much smaller than the remainder of the extrusion flow cross-sectional area at any particular cross-section of said dies, and wherein the shearing deformation is applied from land-to-land through the thickness of said material.

2. The method of claim 1 wherein said providing step includes providing polymeric material to be extruded.

3. The method of claim 1 wherein said providing step includes providing metallic material to be extruded.

4. The method of claim 1 wherein said applying step includes applying extruding forces to said extrudable material to produce tubular extruded material.

5. The method of claim 1 wherein said applying step includes applying extruding forces to said extrudable material to produce sheet extruded material.

6. The method of claim 1 wherein said applying step includes applying extruding forces to said extrudable material to produce profile shaped extruded material.

7. Apparatus for extruding material having increased strength transverse to the direction of extrusion and tangential to the extruded material surface comprising:

first and second dies spaced from one another; and two sets of shearing grooves with opposing lands on said first and second dies, respectively, on said first and second dies for applying to the greater part of material being extruded by said dies, a large shearing deformation with material displacement in a direction tangential to the surfaces of the material and generally perpendicular to the direction of extrusion, said displacement having a displacement gradient in a direction perpendicular to said surfaces as the cross section of the extruded material is being reduced so as to produce extruded material with increased strength transverse to the direction of extrusion and with a minimum of unsheared material, wherein the total extrusion flow cross-sectional area of said grooves is much smaller than the remainder of the extrusion flow cross-sectional area at any particular cross-section of said dies, and wherein the shearing deformation is applied from land-to-land through the thickness of said material.

8. The apparatus of claim 7 wherein at least one of said two sets of shearing grooves on said first and second dies, respectively, extends in the direction of but at an angle to said direction of extrusion.

9. Apparatus for extruding tubular material having increased strength transverse to the direction of extrusion and tangential to the tubing surface, comprising:

an inner die;

an outer die spaced from and surrounding said inner die; and two sets of shearing grooves having opposing lands on said inner and said outer dies for applying to the greater part of material being extruded by said dies, a large shearing deformation with material displacement in a direction tangential to the surfaces of the materials and generally perpendicular to the direction of extrusion, said displacement having a displacement gradient in a direction perpendicular to said surfaces, as the cross-section of the extruded material is being reduced, so as to produce extruded tubular material with increased strength transverse to the direction of extrusion and tangential to the tubing surfaces with a minimum of unsheared material, wherein the total extrusion flow cross-sectional area of said grooves is much smaller than the remainder of the extrusion flow cross-sectional area at any particular cross-section of said dies, and wherein the shearing deformation is applied from land-to-land through the thickness of said material.

10. The apparatus of claim 9 wherein said two sets of shearing grooves, on said inner and outer dies, respectively, extend in the direction of, but at different or opposite angles to said direction of extrusion.

11. The apparatus of claim 9 wherein of said two sets of shearing grooves on said inner and outer dies, respectively, one set extends in the direction of, but at an angle to the direction of extrusion, and the other set extends in the direction of said direction of extrusion.

12. The apparatus of claim 9 including two sets of shearing grooves on said inner and said outer dies respectively, at least one of which set of grooves extend in the direction of, but at an angle to said direction of extrusion means to rotate the inner die about its axis of symmetry relative to the outer die during extrusion.

13. The apparatus of claim 12 wherein one set of shearing grooves extends parallel to the direction of extrusion.

14. The apparatus of claim 12 wherein both sets of shearing grooves extend at different or opposite angles to the direction of extrusion.

15. The apparatus of claim 9 wherein said inner die is either an integral extension of or mounted axially on, the extruder feed screw so that it rotates along with said feed screw.

16. Apparatus for extruding material of a predetermined, walled cross-section, comprising:

first and second dies spaced from one another having two sets of shearing grooves with lands on said dies, respectively, for applying a large shearing deformation with material displacement in a direction tangential to the surface of and generally perpendicular to the direction of extrusion, said displacement having a displacement gradient in a direction perpendicular to said surface as it is being extruded and the cross-sectional area of the extruded material is being reduced, where the total extrusion flow cross-sectional area of the grooves is much smaller than the remainder of the extrusional flow cross-sectional area at any particular cross section of the dies, and where the shearing deformation is applied land-to-land through said material.

17. The apparatus of claim 16 wherein said shearing grooves have rectangular cross-sections.

18. The apparatus of claim 16 wherein said shearing grooves have frustra of isosceles triangular cross-sections.

19. The apparatus of claim 16 wherein said of shearing grooves have frustra of a right triangular cross-sections.

20. The apparatus of claim 16 wherein said shearing grooves have isosceles triangular cross-sections.

21. The apparatus of claim 16 wherein said shearing grooves have right triangular cross-sections.

22. Apparatus for extruding sheet material having increased transverse strength, comprising:

an upper die;

a lower die; and two sets of shearing grooves having opposing lands on said upper die and said lower dies, respectively, for applying to material being extruded through said dies, a large shearing deformation with material displacement in a direction tangential to the surface of said material and generally perpendicular to the direction of extrusion as the cross-sectional area of the extruded material is being reduced, said displacement having a displacement gradient in a direction perpendicular to said surfaces, so as to produce extruded sheet material with increased strength transverse to the direction of extrusion and with a minimum of unsheared material, such that the amount of extruded unsheared material is less than the amount of extruded, sheared material, wherein the total extrusion flow cross-sectional area of said grooves is much smaller than the remainder of the extrusion flow cross-sectional area at any particular cross-section of said dies, and wherein the shearing deformation are applied from land-to-land through the thickness of said material.

23. The apparatus of claim 22 wherein said two sets of shearing grooves on said upper and lower dies, respectively, extend in the direction of, but at opposite angles to said direction of extrusion.

* * * * *